United States Patent
Fiebrich et al.

(10) Patent No.: US 9,128,706 B2
(45) Date of Patent: *Sep. 8, 2015

(54) DEVICE CHARGING SYSTEM

(75) Inventors: Greg R. Fiebrich, Georgetown, TX (US); Douglas Evan Messick, Austin, TX (US); Kyle E. Cross, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 966 days.

This patent is subject to a terminal disclaimer.

(21) Appl. No.: 13/223,871

(22) Filed: Sep. 1, 2011

(65) Prior Publication Data

US 2012/0005502 A1 Jan. 5, 2012

Related U.S. Application Data

(63) Continuation of application No. 12/110,766, filed on Apr. 28, 2008, now Pat. No. 8,037,331.

(51) Int. Cl.
*G06F 1/26* (2006.01)
*G06F 1/32* (2006.01)

(52) U.S. Cl.
CPC .............. *G06F 1/3203* (2013.01); *G06F 1/266* (2013.01)

(58) Field of Classification Search
CPC ....... G06F 1/3203; G06F 1/266; G06F 1/263; G06F 1/26; G06F 1/328
USPC .................................................. 713/300–340
See application file for complete search history.

(56) References Cited

U.S. PATENT DOCUMENTS

| | | | |
|---|---|---|---|
| 4,126,765 | A | 11/1978 | Calder |
| 4,583,034 | A | 4/1986 | Martin |
| 5,153,558 | A | 10/1992 | Robinson et al. |
| 5,650,669 | A | 7/1997 | Aldous |
| 5,818,201 | A | 10/1998 | Stockstad et al. |

(Continued)

FOREIGN PATENT DOCUMENTS

| | | |
|---|---|---|
| JP | 01085539 A | 3/1989 |
| JP | 04150625 A | 5/1992 |

(Continued)

OTHER PUBLICATIONS

Benini, L.; Macii, A.; Macii, E.; Poncino, M.; Scarsi, R.; "Scheduling battery usage in mobile systems," Very Large Scale Integration (VLSI) Systems, IEEE Transactions on, vol. 11, No. 6, pp. 1136-1143, Dec. 2003.

(Continued)

*Primary Examiner* — Faisal M Zaman
(74) *Attorney, Agent, or Firm* — Haynes and Boone, LLP

(57) ABSTRACT

Optimized bus powered peripheral battery charging includes a circuit to initiate a change in an advanced configuration and power interface (ACPI) state in a controller allowing charging of a peripheral device battery, the circuit including a signal converter coupled between an input port and the controller to sense when a the peripheral device battery is coupled to an input port and to restrict the controller from changing ACPI state multiple times for a given peripheral device battery coupling; and a ground loop detector coupled in parallel to the signal converter between the input port and the controller to allow the controller to know that the peripheral device battery has maintained being coupled to the input port.

20 Claims, 2 Drawing Sheets

(56) References Cited

U.S. PATENT DOCUMENTS

| | | |
|---|---|---|
| 5,970,428 A | 10/1999 | Brennan |
| 6,189,108 B1 | 2/2001 | Cromer et al. |
| 6,222,347 B1 | 4/2001 | Gong |
| 6,266,776 B1 | 7/2001 | Sakai |
| 6,331,744 B1 | 12/2001 | Chen et al. |
| 6,380,714 B1 | 4/2002 | Chou |
| 6,523,122 B1 | 2/2003 | Moon |
| 6,774,604 B2 * | 8/2004 | Matsuda et al. .............. 320/110 |
| 6,782,491 B1 * | 8/2004 | Foedlmeier et al. ............ 714/37 |
| 6,820,206 B1 | 11/2004 | Kim et al. |
| 6,946,817 B2 * | 9/2005 | Fischer et al. ................ 320/132 |
| 7,058,832 B2 | 6/2006 | Sachs |
| 7,082,543 B2 | 7/2006 | Lin |
| 7,170,259 B2 | 1/2007 | Veseli |
| 7,171,569 B2 | 1/2007 | Ohishi et al. |
| 7,240,227 B2 | 7/2007 | Maezawa |
| 7,296,164 B2 | 11/2007 | Breen et al. |
| 7,296,171 B2 | 11/2007 | Hahn et al. |
| 7,321,974 B2 | 1/2008 | Anderson et al. |
| 7,437,578 B2 | 10/2008 | Menzl |
| 7,437,586 B2 | 10/2008 | Cornelius |
| 7,570,015 B2 | 8/2009 | Bansal et al. |
| 7,631,205 B2 | 12/2009 | Sakemoto et al. |
| 7,689,851 B2 | 3/2010 | Sawyers et al. |
| 7,793,115 B2 | 9/2010 | Tipley et al. |
| 2002/0157039 A1 | 10/2002 | Ihara |
| 2002/0162036 A1 * | 10/2002 | Kim et al. ..................... 713/300 |
| 2003/0159076 A1 | 8/2003 | Delisle et al. |
| 2003/0221135 A1 * | 11/2003 | Motoe et al. ................... 713/300 |
| 2004/0063464 A1 * | 4/2004 | Akram et al. .................. 455/559 |
| 2004/0158751 A1 * | 8/2004 | Lam et al. ..................... 713/320 |
| 2004/0187042 A1 * | 9/2004 | Kawanabe .................... 713/300 |
| 2006/0035527 A1 * | 2/2006 | Numano ....................... 439/668 |
| 2006/0117195 A1 * | 6/2006 | Niwa et al. .................... 713/300 |
| 2007/0101172 A1 | 5/2007 | Ohyama |
| 2007/0124604 A1 * | 5/2007 | Feldstein et al. .............. 713/300 |
| 2008/0229121 A1 * | 9/2008 | Lassa et al. ................... 713/300 |
| 2008/0294923 A1 * | 11/2008 | Barake et al. ................. 713/330 |
| 2009/0217065 A1 | 8/2009 | Araujo, Jr. |
| 2009/0271644 A1 * | 10/2009 | Fiebrich et al. ............... 713/320 |
| 2010/0100752 A1 | 4/2010 | Chueh et al. |
| 2010/0128632 A1 * | 5/2010 | Mantysalo .................... 370/254 |

FOREIGN PATENT DOCUMENTS

| | | |
|---|---|---|
| JP | 2000165478 A | 6/2000 |
| JP | 2000278948 A | 10/2000 |
| JP | 2005005009 A | 1/2005 |
| JP | 2006187113 A | 7/2006 |
| JP | 2008278570 A | 11/2008 |

OTHER PUBLICATIONS

Buennemeyer, T.K.; Nelson, T.M.; Marchany, R.C.; Tront, J.G.; "Polling the smart battery for efficiency: Lifetime optimization in battery-sensing intrusion protection systems," SoutheastCon, 2007. Proceedings. IEEE, pp. 740-745, Mar. 22-25, 2007.

Kularatna, N.; "Rechargeable batteries and their management," Instrumentation & Measurement Magazine, IEEE, vol. 14, No. 2, pp. 20-23, Apr. 2011.

Ying-Wen Bai; Hsiu-Chen Chen;, "Design and Implementation of Low-Power Tablet PCs," Sep. 11, 2006, Consumer Electronics, 2006. ISCE '06. 2006 IEEE Tenth International Symposium on, pp. 1-6.

* cited by examiner

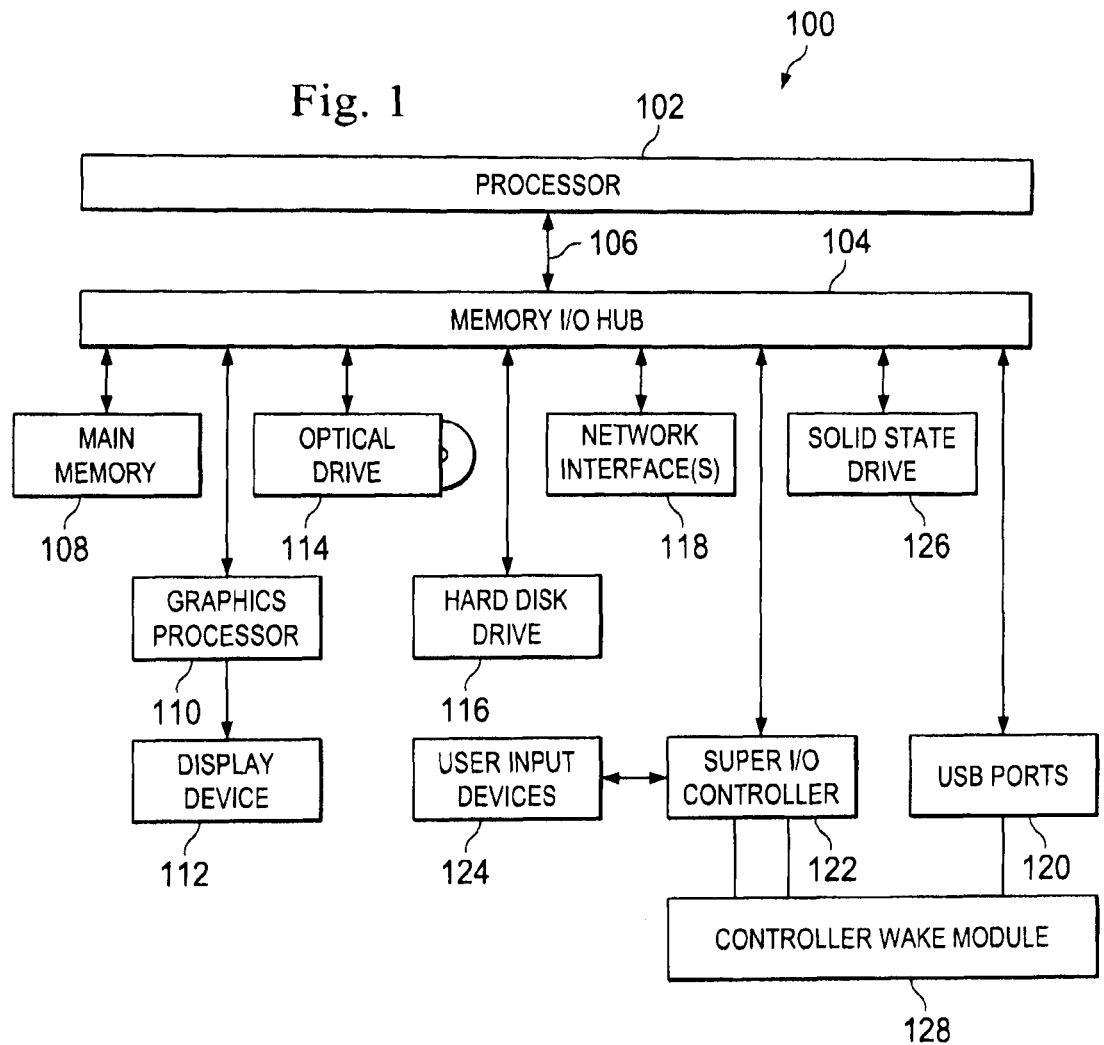
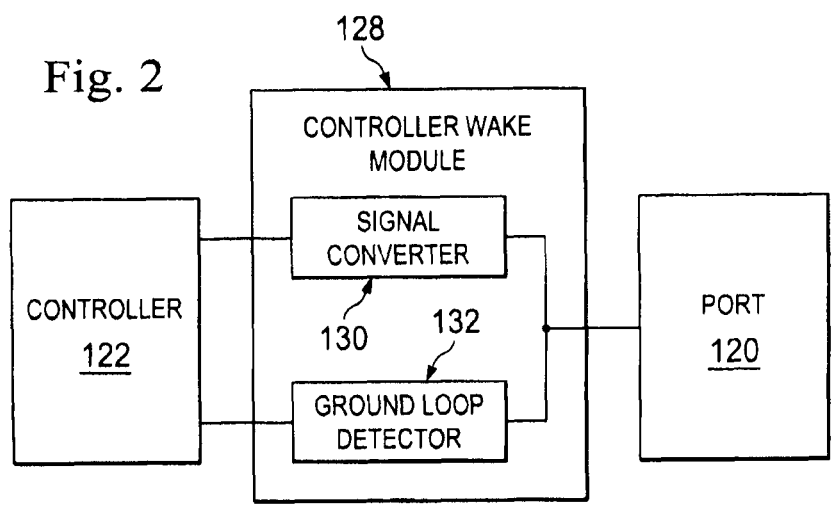

DEVICE CHARGING SYSTEM

CROSS REFERENCE TO RELATED APPLICATIONS

The present application claims priority to and is a continuation of co-owned, co-pending U.S. patent application Ser. No. 12/110,766 filed Apr. 28, 2008, the disclosure of which is incorporated herein by reference.

BACKGROUND

The present disclosure relates generally to information handling systems, and more particularly to an energy efficient method to wake a host system for charging battery powered portable devices via bus powered external i/o ports.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

With the proliferation of small, battery powered electronic peripheral devices, such as digital cameras, music players, mobile telephones, and a variety of other small electronic devices, there is a need for recharging the batteries for these devices. One way to recharge the batteries of these devices may be to charge the batteries from a larger capacity battery, such as the battery for a portable or notebook-type IHS. Typically, when the IHS is not being used, or is not plugged in to a power source, the IHS is put into an advanced configuration and power interface (ACPI) deep sleep mode known as G3. This time of non-use for the IHS may be when the user wishes to charge the batteries of the peripheral device. In order to support charging the peripheral device, the IHS should wake to ACPI S5. This can be a large drain on the IHS battery and therefore, an efficient system and method for waking the IHS from the G3 mode and maintaining long battery life is desirable.

Accordingly, it would be desirable to provide an energy efficient method to wake a host system for charging battery powered portable devices via bus powered external i/o ports.

SUMMARY

According to one embodiment, optimized bus powered peripheral battery charging includes a circuit to initiate a change in an advanced configuration and power interface (ACPI) state in a controller allowing charging of a peripheral device battery, the circuit including a signal converter coupled between an input port and the controller to sense when the peripheral device battery is coupled to an input port and to restrict the controller from changing ACPI state multiple times for a given peripheral device battery coupling; and a ground loop detector coupled in parallel to the signal converter between the input port and the controller to allow the controller to know that the peripheral device battery has maintained being coupled to the input port.

BRIEF DESCRIPTION OF THE DRAWINGS

FIG. 1 illustrates an embodiment of an information handling system (IHS).

FIG. 2 illustrates a block diagram of an embodiment of a controller wake module to wake a controller from a sleep mode.

DETAILED DESCRIPTION

Figure 3:
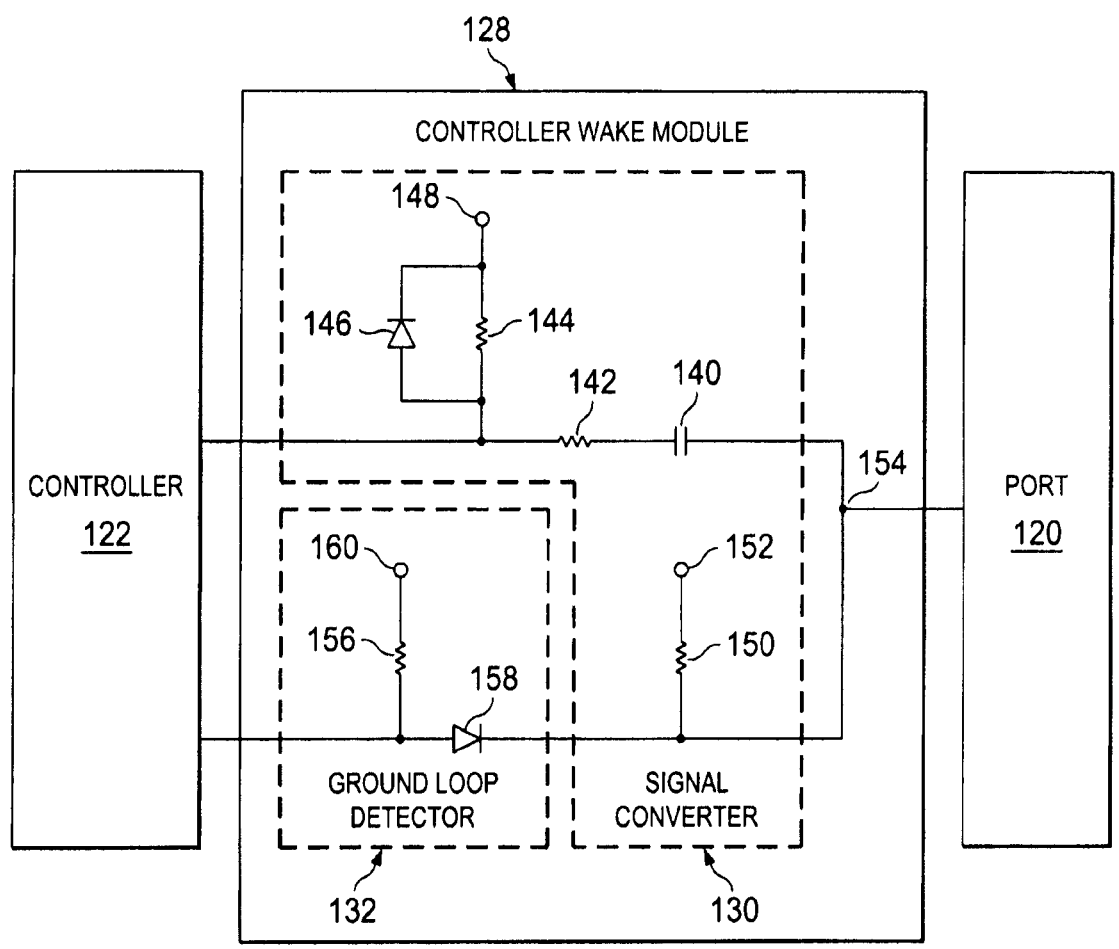
FIG. 3 illustrates a schematic diagram of an embodiment of the controller wake module of FIG. 2.

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 1 is a block diagram of one IHS 100. The IHS 100 includes a processor 102 such as an Intel Pentium TM series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Also shown in FIG. 1 is a controller wake module 128 coupled between the controller 122 and the port 120. Operation and configuration of an embodiment of the wake module 128 are discussed in more detail below with respect to FIGS. 2-3.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

An IHS 100 may allow charging of a peripheral device battery via a USB port 120 when the IHS 100 system is in what is commonly known in the art as an Advanced Configuration and Power Interface (ACPI) S5 power state. ACPI power states are generally known as an open industry standard allowing a combination of operating system (OS) control and/or basic input output system (BIOS) control of power management for the IHS 100. The ACPI states allow the IHS 100 to adjust to higher or lower performance states depending on system demand. Using the ACPI states, the IHS 100 may be put into extremely low power consumption states. From these states, the controller 122 and/or the IHS 100 may be quickly awakened by general purpose events, such as, interrupts, the clock, the keyboard, a modem, and/or a variety of other events. When a notebook-type IHS 100 is powered off, with only battery power inserted, (e.g., not plugged in) the IHS 100 may be set to the ACPI G3 power state, which consumes almost no power, and thus maintains a long battery life. However, supporting the USB charging feature on an IHS 100 poses a problem of how to wake from ACPI G3 state to ACPI S5 state to allow charging of the peripheral device battery and how to best manage the power states to maximize battery life. It should be understood that any state change may be utilized with the present disclosure.

In an embodiment, a peripheral device battery may be charged via the USB port 120 while the IHS 100 is in ACPI S5 state. A controller 122 (e.g., an embedded controller) in the IHS 100 may "wake-up" via power switch inputs, when a user presses the power switch button, but previous disclosures for this are limited to waking up the controller 122 and then allowing the controller 122 to decide if the IHS 100 system should wake up. In addition, using a power switch input that is connected directly to a connector ground loop detection circuit can cause a large drain on a coin cell battery or other power source used to power the ACPI G3 circuitry in the controller 122. Thus, there is no previous system and method defined for a device that uses a connector detect to wake the system, such as the USB connector port 120.

FIG. 2 illustrates a block diagram of an embodiment of a controller wake module 128 to wake the controller 122 from a sleep mode, such as ACPI G3 state. In an embodiment, the controller wake module 128 comprises a signal converter 130 and a ground loop detector, in parallel, between the controller 122 and the port 120.

FIG. 3 illustrates a schematic diagram of an embodiment of the controller wake module 128 of FIG. 2. In this embodiment, the signal converter 130 includes a blocking capacitor 140, resistors 142, 144, and 150 and diode 146. Resistor 142 is coupled between the capacitor 140 and the controller 122. Resistor 144 and diode 146 are coupled between node 148 and the controller 122. Resistor 150 is coupled between node 152 and node 154. In an embodiment, nodes 148 and 152 are coupled to a first power rail, such as a G3 power rail. In this embodiment, the ground loop detector 132 includes a resistor 156 and a diode 158. The resistor 156 is coupled between node 160 and the controller 122. The diode 158 is coupled between the node 154 and the controller 122. In an embodiment, the node 160 is coupled to a second power rail, such as an S5 power rail. It is to be noted that diodes 146 and 158 are optional and may be removed from the system (e.g., the diode 158 may be included to prevent electrical shorts from the G3 power rail to the S5 power rail).

The signal converter 130 generally enables the controller 122 to monitor the port 120 (e.g., a USB port) for device insertion (e.g., for charging a peripheral device battery) by transforming a high to low DC transition, seen upon insertion to the port 120 into high to low pulse of limited duration so that the controller 122 can recognize the signal through an input, such as, a power switch input on the controller 122, as a valid power switch input assertion according to its specifications while ensuring that the controller 122 is not damaged. The ground loop detector 132 generally enables the controller to monitor the port 120 during ACPI S5, when the controller logic is operational, for example through a general purpose input on the controller 122 because the signal converter 130 limits the power switch input from being used to do so.

During operation of an embodiment as illustrated in FIG. 3, before a device is plugged into the port 120, the system is in a G3 state and the electrical charge on either side of the capacitor 140 is held high. Upon insertion of a device into the port 120, a detect switch in the port 120 is grounded, which results in a falling edge signal. The capacitor 140 in the signal converter converts that falling edge into a signal that the controller 122 can recognize, a high to low pulse of limited duration, (and that will not damage the EC), and that signal is used to awaken the controller 122. The controller 122 then changes the system ACPI state from G3 to S5 and turns on power to port 120 to allow the device that is plugged into the port 120 to be charged through that port 120.

The components of the signal converter 130 (capacitor 140 and resistors 142, 144, and 150) may be chosen to "tune" the signal converter such that the signal it provides to the controller will allow the controller to recognize a single insertion event into port 120 while the system is in a G3 state.

The circuit allows the controller 122 to wake the system from G3 in order to charge a peripheral device from the USB Port in S5 with no other power rails turned on. As is standard in the industry, the charging signal to charge the peripheral device via the port 120 controls a charging power source (not shown). After the falling edge has been converted to the signal that wakes the controller 122, the capacitor 140 charges back up on the side opposite the port 120 such that the power switch input on the controller 122 is held high. This limits the Controller 122 from waking more than once from a given insertion of a device in the port 120. This may be a problem which occurs if the capacitor 140 is not in the circuit. When the device is removed from the port 120, the capacitor 140 quickly discharges until the charge on both sides of the capacitor 140 are again held high such that another device insertion in the USB Port causing another falling edge will wake the controller 122 (e.g., the system is again "armed".)

In an embodiment of the present disclosure, a DC blocking capacitor 140 is used to transform the falling edge on the controller 122 power switch input that is caused by a USB connector insertion to the port 120. The falling edge should be sufficiently long to wake the controller 122 once, but after that time the capacitor 140 will begin charging back up to hold the power switch input high. This will prevent the controller 140 from waking more than once from a given insertion of a USB device, and will thus save battery life and prevent hysteresis behavior. When the USB connector is removed, the capacitor 140 will discharge, and the power switch will once again be "armed" to wake the system. In an embodiment, a run-time (S5 or greater) general purpose input (GPI) on the controller 122 will also be connected to the USB connector ground loop detector 132 in parallel. This input will allow the controller 122 to know at run time (S5 or greater) that a device is still connected, because the DC blocking capacitor 140 will prevent the power switch input from being used for this purpose. Thus, the GPI may enable code to allow different behaviors for AC vs. battery power, allow more complicated watchdog timer decision trees, power down as soon as a device is disconnected, and a variety of other features. In another embodiment, the GPI may allow the controller 122 to set a timer that may automatically return the system to fully off (ACPI G3). This may be very useful because the DC blocking capacitor 140 can prevent further wake events via the power switch input of the controller 122.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device battery charging system, comprising:
    an input port that is operable to couple to a device battery;
    a controller that is operable to enable power from a charging battery in a charging system to be supplied to the input port;
    a converter that is coupled between the input port and the controller, wherein the converter is operable to sense the coupling of the device battery to the input port when the input port is not being supplied power from the charging battery and, in response, send a signal to the controller, and wherein in response to the signal, the controller is operable to change a power management state of the charging system such that power from the charging battery is supplied to the input port to charge the device battery, and wherein the converter is also operable to restrict the controller from changing the power management state of the charging system multiple times for a given coupling of the device battery to the input port; and
    a detector that is coupled between the input port and the controller and that is operable to allow the controller to determine that the device battery has maintained being coupled to the input port upon the charging system changing power management states and entering a run time state.

2. The circuit of claim 1, wherein the converter is coupled to a power switch input of the controller.

3. The circuit of claim 2, wherein the converter is operable to translate a falling edge at the input port into a limited duration pulse at the power switch input of the controller.

4. The circuit of claim 1, wherein the detector is coupled to a general purpose input of the controller.

5. The circuit of claim 1, wherein the converter further comprises:
    a capacitor in series between the input port and the controller.

6. The circuit of claim 1, wherein the input port is a universal serial bus (USB) port.

7. The circuit of claim 1, wherein the change in the power management state of the charging system is a change from a deep sleep state in which the charging battery is not operable to charge the device battery to a sleep state in which the charging battery is operable to charge the device battery.

8. An information handling system (IHS), comprising:
    a processor;
    a charging battery coupled to the processor;
    a controller coupled to the processor;
    an input port coupled to the processor;
    a converter that is coupled between the input port and the controller and that is operable to sense that a device battery is coupled to the input port when the input port is not being supplied power from the charging battery and, in response, send a signal to the controller, wherein in response to the signal, the controller is operable to change a power management state of the IHS such that power from the charging battery is supplied to the input port to charge the device battery, and wherein the converter is also operable to restrict the controller from changing the power management state of the IHS multiple times for a given coupling of the device battery to the input port; and
    a detector that is coupled between the input port and the controller and that is operable to allow the controller to determine that the device battery has maintained being coupled to the input port upon the IHS changing power management states and entering a run time state.

9. The IHS of claim 8, wherein the converter is coupled to a power switch input of the controller.

10. The IHS of claim 9, wherein the converter is operable to translate a falling edge at the input port into a limited duration pulse at the power switch input of the controller.

11. The IHS of claim 8, wherein the detector is coupled to a general purpose input of the controller.

12. The IHS of claim 8, wherein the converter further comprises:
    a capacitor in series between the input port and the controller.

13. The IHS of claim 8, wherein the input port is a universal serial bus (USB) port.

14. The IHS of claim 8, wherein the change in the power management state of the IHS is a change from a deep sleep state in which the charging battery is not operable to charge the device battery to a sleep state in which the charging battery is operable to charge the device battery.

15. A device battery charging method, comprising:
    providing a charging system including a charging battery and an input port coupled to the charging battery;
    detecting the coupling of a device battery to the input port when the input port is not being supplied power and, in response, changing a power management state of the charging system such that power from the charging battery is supplied to the input port to charge the device battery;
    restricting the changing of the power management state of the charging system multiple times for a given coupling of the device battery to the input port; and
    determining that the device battery has maintained being coupled to the input port upon the charging system changing power management states to a run time state.

16. The method of claim 15, wherein the charging system includes a converter that is coupled between the input port and a controller, and wherein the converter performs the detecting of the coupling of the device battery to the input port.

17. The method of claim 16, wherein the detecting by the converter includes translating a falling edge at the input port into a limited duration pulse at a power switch input of the controller.

18. The method of claim 15, wherein a detector is coupled to a general purpose input of a controller, and wherein the detector allows the controller to perform the determining that the device battery has maintained being coupled to the input port at the run time state of the charging system.

19. The method of claim 16, wherein the converter includes a capacitor in series between the input port and the controller.

20. The method of claim 15, wherein the change in the power management state of the charging system is a change from a deep sleep state in which the charging battery is not operable to charge the device battery to a sleep state in which the charging battery is operable to charge the device battery.

* * * * *